US012168470B2

(12) United States Patent
Pichonnat et al.

(10) Patent No.: US 12,168,470 B2
(45) Date of Patent: Dec. 17, 2024

(54) STEERING COLUMN WITH VERIFIABLE ADJUSTABILITY AND METHOD FOR OPERATING SUCH A STEERING COLUMN (71) Applicants: thyssenkrupp Presta AG, Eschen (LI); thyssenkrupp AG, Essen (DE)

(72) Inventors: Christian Pichonnat, Indianapolis, IN (US); Andreas Willi, Lauterach (AT)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 0 days.

(21) Appl. No.: 18/265,924

(22) PCT Filed: Dec. 6, 2021

(86) PCT No.: PCT/EP2021/084460
§ 371 (c)(1),
(2) Date: Jun. 7, 2023

(87) PCT Pub. No.: WO2022/122680
PCT Pub. Date: Jun. 16, 2022

(65) Prior Publication Data
US 2024/0025469 A1 Jan. 25, 2024

(30) Foreign Application Priority Data

Dec. 11, 2020 (DE) .................... 10 2020 215 759.6

(51) Int. Cl.
B62D 1/181 (2006.01)
B62D 1/185 (2006.01)
(52) U.S. Cl.
CPC ............ B62D 1/181 (2013.01); B62D 1/185 (2013.01)

(58) Field of Classification Search
CPC ................................ B62D 1/181; B62D 1/185
See application file for complete search history.

(56) References Cited

U.S. PATENT DOCUMENTS 11,465,666 B2 * 10/2022 Ochi ...................... B62D 1/183
2016/0200344 A1 7/2016 Sugioka et al.
(Continued)

FOREIGN PATENT DOCUMENTS

CN 113329930 A * 8/2021 ............. B62D 1/181
CN 115107511 A * 9/2022 ............. B60K 26/02
(Continued)

OTHER PUBLICATIONS

English Translation of International Search Report issued in PCT/EP2021/084460, dated Mar. 11, 2022.

Primary Examiner — Drew J Brown
(74) Attorney, Agent, or Firm — thyssenkrupp North America, LLC (57) ABSTRACT The present disclosure relates to an adjustable steering column for a motor vehicle, comprising a support unit by which a positioning unit is adjustably held, and an adjustment device which is designed to adjust the positioning unit relative to the support unit. Associated with the steering column is a control unit which is designed to receive a signal, to evaluate the signal in terms of a predefined release condition, and to produce a release state of the steering column when the signal meets the release condition, and to produce a locked state of the steering column when the signal does not meet the release condition. Adjustment of the positioning unit is thus enabled exclusively in the release state.

17 Claims, 5 Drawing Sheets (56) References Cited

U.S. PATENT DOCUMENTS

| | | | |
|---|---|---|---|
| 2016/0368522 A1* | 12/2016 | Lubischer | B62D 1/105 |
| 2017/0151975 A1 | 6/2017 | Schmidt et al. | |
| 2017/0294120 A1* | 10/2017 | Ootsuji | G08G 1/096725 |
| 2018/0079441 A1 | 3/2018 | Mckinzie et al. | |
| 2018/0148084 A1* | 5/2018 | Nash | B60Q 9/00 |
| 2018/0154932 A1* | 6/2018 | Rakouth | B62D 1/286 |
| 2018/0229753 A1* | 8/2018 | Magnus | F16D 1/00 |
| 2018/0251147 A1* | 9/2018 | Heitz | B62D 1/181 |
| 2019/0185041 A1 | 6/2019 | Shin et al. | |
| 2020/0130723 A1* | 4/2020 | Cao | B62D 1/183 |
| 2021/0291890 A1 | 9/2021 | Kreutz et al. | |
| 2022/0274639 A1* | 9/2022 | Park | B62D 1/183 |

FOREIGN PATENT DOCUMENTS

| | | | | |
|---|---|---|---|---|
| DE | 102012022533 A1 | | 5/2014 | |
| DE | 102014216140 A1 | | 2/2016 | |
| DE | 102017000354 A1 | | 7/2018 | |
| DE | 102018221992 A1 | | 6/2019 | |
| DE | 10 2019 108 466 A1 | | 2/2020 | |
| DE | 102021201759 A1 * | | 8/2022 | |
| EP | 3042825 A1 | | 7/2016 | |
| EP | 4039561 A2 * | | 8/2022 | B60K 23/00 |
| WO | WO-2020213546 A1 * | | 10/2020 | B62D 1/187 |

\* cited by examiner

STEERING COLUMN WITH VERIFIABLE ADJUSTABILITY AND METHOD FOR OPERATING SUCH A STEERING COLUMN

CROSS REFERENCE TO RELATED APPLICATIONS

This application is a U.S. National Stage Entry of International Patent Application Serial Number PCT/EP2021/084460, filed Dec. 6, 2021, which claims priority to German Patent Application No. DE 10 2020 215 759.6, filed Dec. 11, 2020, the entire contents of all of which are incorporated herein by reference.

FIELD

The present disclosure generally relates to a steering column, and more specifically to a moveable steering column having an adjustment device which is designed to adjust a positioning unit relative to a support unit.

BACKGROUND

US 2018/0079441 A1 from the prior art discloses a steering column which can be adjusted between a stowed position and an operating position. Furthermore, DE 10 2019 108 466 A1 discloses an adjustable steering column with a positioning unit and a support unit for a motor vehicle, wherein the steering column can be moved into a stowed position. The position of a positioning unit relative to the support unit is determined by means of a position detection apparatus, wherein the positioning unit is adjusted taking into account the detected position. It is known from EP 3 042 825 A1, for a steering wheel assembly with an electrically adjustable steering wheel, to detect a contact or resistance when the steering wheel is move backward. Moreover, this document discloses the detection of a driving state in which the vehicle is not being driven, wherein, in such a driving state, the steering wheel can be moved backward automatically. These adjustment options entail in particular greater comfort for the driver of a vehicle.

Adjusting the steering wheel or another steering handle can here represent a safety risk in certain driving situations.

Thus a need exists to provide an improved adjustable steering column which can be operated in particular without affecting the driving safety.

In order to achieve this an adjustable steering column, a method for operating an adjustable steering column, and a motor vehicle with an adjustable steering column that are safer and more effective are proposed.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to an adjustable steering column for a motor vehicle, comprising a support unit by which a positioning unit is adjustably held, and an adjustment device which is designed to adjust the positioning unit relative to the support unit. Associated with the steering column is a control unit, the control unit being designed to receive at least one signal. The disclosure further relates to a motor vehicle with such a steering column. Lastly, the disclosure relates to a method for operating an adjustable steering column with an adjustment device which is designed to adjust a positioning unit of the steering column relative to a support unit of the steering column, in particular to adjust it between a stowed position and a use position, wherein a control unit associated with the steering column receives at least one signal.

The proposed solution provides an adjustable steering column for a motor vehicle comprising a support unit, by which the positioning unit is adjustably held, and an adjustment device which is designed to adjust the positioning unit relative to the support unit. Associated with the steering column is a control unit which is designed to receive at least one signal, to evaluate the at least one signal in terms of a predefined release condition, and to produce a release state of the steering column when the at least one signal meets the release condition. The control unit is furthermore designed to produce a locked state of the steering column when the at least one signal does not meet the release condition.

Adjustment of the positioning unit is here advantageously enabled exclusively in the release state. In the locked state, adjustment of the positioning unit is advantageously not enabled. The driving situations can advantageously be categorized into driving situations with potential danger and driving situations with no potential danger by checking a release condition and producing a release or locked state depending on the situation. In this way, the risk that adjustment of the steering column takes place in a driving situation with potential danger can advantageously be prevented or at least considerably reduced. The control unit associated with the steering column is here in particular an ECU (electronic control unit) of a motor vehicle which is preferably connected to the steering column via a correspondingly designed interface in order to transmit signals. In particular where the control unit associated with the steering column is not comprised by the steering column, the disclosure also provides in order to achieve the object a motor vehicle with a central control unit and an adjustable steering column configured according to the disclosure, wherein the central control unit of the motor vehicle is the control unit associated with the steering column. It is in particular provided that the steering column comprises an independent control unit, wherein this control unit is the control unit associated with the steering column.

The at least one signal, for the receipt of which the control unit is designed, advantageously comprises at least one sensor signal and/or at least one control signal from a control unit of a motor vehicle. In particular, the steering column can have at least one corresponding sensor. It is additionally or alternatively provided that the sensor signal is supplied by at least one sensor arranged outside the steering column. An advantageous configuration of the steering column comprises an interface for attachment of an external sensor and/or an external control unit. In particular when the control unit associated with the steering column is not comprised by the steering column, it is provided to connect the control unit associated with the steering column to the steering column via this interface.

The at least one sensor signal, for the receipt of which the control unit is designed, advantageously relates to at least one driving parameter of a motor vehicle, in particular a driving parameter of a motor vehicle which can deliver the information about a dangerous situation. In particular, a current acceleration and/or a current driving mode, in particular a self-driving mode or a manual driving mode, is provided for sensor-based monitoring. The at least one sensor signal is furthermore in particular a sensor signal relating to a vehicle surroundings. The corresponding sensor signal is here transmitted in particular to the control unit. The received at least one sensor signal is advantageously evaluated by the control unit associated with the steering column and assessed in terms of a predefined release condition. In particular, predefined sensor values and/or sensor value ranges in a look-up table of the control unit can be associated with either a release state or a locked state. It is additionally or alternatively provided that at least one control signal is transmitted from a control unit of a motor vehicle to the control unit associated with the steering column. Use is made here in particular of control signals of safety-relevant driver assistance systems which in particular perform a crash assessment when a motor vehicle is being driven. Control signals which here indicate a dangerous situation and, for example, also activate the motor vehicle restraint systems are thus received by the control unit associated with the steering column. The control unit is here designed to evaluate the control signals in terms of a predefined release condition, wherein the release condition is in particular met when the control signals match corresponding control signals in the case of normal safe driving mode. In particular when the control signals trigger a restraint system or a restraint system would be shifted into a state in preparation for triggering, the corresponding control signal does not meet the release condition. The steering column is then in the locked state.

According to a further configuration of the disclosure, the steering column is designed to receive a request signal for initiation of an adjustment procedure of the positioning unit and, when the request signal is received, to enable adjustment of the positioning unit if the release state is produced on receipt of the request signal. As a result, a check is advantageously made before each adjustment procedure as to whether the release state or the locked state is active. It is thus advantageously ensured that an adjustment procedure cannot be carried out in a driving situation which has been assessed as risky, which does not meet the release condition, and which hence is associated with the locked state. The request signal is here associated in particular with the actuation of an operating element which needs to be actuated for adjustment of the positioning unit.

In the case of a partially or exclusively manually adjusted steering column, an electrically controllable switch element is in particular provided which immobilizes an operating unit for manual adjustment of the positioning unit unless the request signal is present and in addition the release state has been produced. The fact that the release state has been produced is here signaled advantageously by the presence of a further signal. The operating unit can, in an advantageous development, be designed as a fixing device, in particular as an electromechanical fixing device, which can advantageously be switched between a fixing position and a release position, wherein the positioning unit is fixed in the fixing position relative to the support unit and can be adjusted in the release position manually relative to the support unit.

An advantageous development of the steering column provides that the control unit is further designed to transmit an output signal, wherein the output signal is designed to activate an output device for outputting a notification. The output device is here in particular an optical and/or acoustic and/or haptic communication device, in particular a display and/or a speaker and/or a vibration device. The output signal is in particular designed to produce a notification relating to a desired adjustment of the steering column or the positioning unit, in particular when the locked state is produced on receipt of the request signal. In this case, in particular an error message is output by the output device, preferably with information about why an adjustment is not possible. The output device is in particular an output device of the motor vehicle in which the steering column is used as intended. In particular, it is provided as an alternative embodiment that the steering column comprises the output device, in particular a vibration device and/or a light source, in particular an LED (light-emitting diode).

According to a further advantageous configuration of the disclosure, the control unit is further designed to receive at least one verification sensor signal in the release state produced and to evaluate the verification sensor signal with reference to a predefined verification condition. The verification sensor signal here advantageously relates to the adjustment procedure as such. The verification sensor signal is here in particular a verification sensor signal relating to the position of the positioning unit and/or relating to the angle of inclination of the positioning unit and/or relating to the telescopic position of the positioning unit. When the release state is produced and adjustment of the positioning unit relative to the support unit is thus enabled, the adjustment is advantageously verified. In particular, the actual position of the positioning unit with reference to the support unit is here advantageously detected and can advantageously be assessed with reference to improved driver protection. In particular, in this way a restricted number of available adjustment options can also be made available or the adjustment options can be excluded. In particular, the correct execution of an automatically running adjustment procedure can advantageously be monitored by this means.

The control unit associated with the steering column is further designed to output a control signal and/or an output signal when the predefined verification condition is not met. This is in particular the case when a deviation from a "normal" adjustment procedure occurs. A vehicle user can advantageously be alerted to the problem that exists by the output signal. The control signal which can optionally be output advantageously functions as a correction signal. By virtue of the presence of this correction signal, advantageously attempts continue to be made to move the positioning unit into the requested target position.

In particular it is provided that the adjustment device of the steering column comprises at least one electric motor for the purpose of adjusting the positioning unit. The control unit associated with the steering column is here designed to receive a request signal for adjusting the positioning unit, to receive the at least one signal, and to activate the at least one electric motor. The control unit is further advantageously designed to evaluate the at least one signal in terms of a predefined release condition on receipt of the request signal and to activate the at least one electric motor in accordance with the request signal when the at least one received signal meets the release condition, and advantageously not to activate the at least one electric motor when the at least one received signal does not meet the release condition. In this respect, adjustment of the positioning unit outside the release state is advantageously prevented. In particular, it is provided according to an advantageous development that the control unit is further designed, when the at least one electric motor is activated, to evaluate the at least one signal or a further signal during an adjustment procedure in terms of a predefined stop condition and advantageously to stop activation of the at least one electric motor when the signal or the further signal meets the stop condition. The safety is advantageously further increased as a result.

The method proposed to achieve the abovementioned object for operating an adjustable steering column, with an adjustment device which is designed to adjust a positioning unit of the steering column relative to a support unit of the steering column, in particular to adjust a positioning unit of the steering column relative to a support unit between a stowed position and a use position, provides that a control unit associated with the steering column receives at least one signal, the control unit evaluates the at least one signal in terms of a predefined release condition, the control unit produces a release state when the at least one signal meets the release condition, the control unit produces a locked state when the at least one signal does not meet the release condition, wherein adjustment of the positioning unit is advantageously prevented in the locked state. Adjustment of the positioning unit is advantageously enabled in the release state. A situation-specific signal is advantageously received and evaluated and adjustment enabled only when the result of the evaluation is that a safe adjustment is possible. Otherwise, namely in the locked state, a corresponding adjustment request is not or cannot be performed. In particular, it is provided that the steering column is here a steering column with the above described features, wherein the steering column can have the features individually or in combination.

The at least one signal received by the control unit is advantageously one of the following signals: at least one sensor signal; at least one control signal from a control unit of a motor vehicle. The sensor signal here preferably relates to at least one driving parameter such as in particular the current speed and/or the current acceleration. The advantage of a control signal from a control unit of a motor vehicle being received by the control unit is in particular that, compared with the sensor signal, the control signal has already undergone assessment by the control unit of the motor vehicle such that as a result resources can advantageously be saved in the case of the control unit associated with the steering column.

According to a particularly advantageous configuration of the method, it is provided that the steering column, in particular the control unit associated with the steering column, receives a request signal for initiation of an adjustment procedure of the positioning unit. The request signal can here be triggered in particular by a user input or automatically, in particular automatically by the central control unit of the motor vehicle. In contrast to known steering columns, this request signal advantageously does not immediately cause the adjustment procedure to begin.

An adjustment procedure of the positioning unit is in particular started on receipt of the request signal when the release state is produced on receipt of the request signal. When the locked state is produced on receipt of the request signal, the adjustment procedure of the positioning unit is advantageously not started. In particular, it is provided that the control unit associated with the steering column transmits a first output signal to an output device, in particular to an output device of the motor vehicle, when the locked state is produced on receipt of the request signal. The user is advantageously thus informed that an adjustment request has not been implemented. In particular, it can be provided that the user is furthermore informed about why an adjustment request cannot currently be implemented and/or which condition needs to be met for it to be possible to implement an adjustment request.

According to a further advantageous configuration of the disclosure, the control unit associated with the steering column receives at least one verification sensor signal. The control unit evaluates the at least one received verification sensor signal in particular in terms of a predefined verification condition, wherein an adjustment procedure of the positioning unit relative to the support unit which has started is continued when the verification sensor signal meets the predefined verification condition. As a result, monitoring of the adjustment procedure advantageously takes place, wherein a proper adjustment can be obtained. In particular, it is provided according to an advantageous development that an adjustment procedure of the positioning unit relative to the support unit which has started is not continued when the verification sensor signal does not meet the predefined verification condition.

It is further advantageously provided that the control unit transmits a second output signal to an output device when the verification sensor signal does not meet the predefined verification condition. A user is advantageously alerted that the verification condition has not been met by means of the output signal. An error message can in particular be produced.

The control unit further advantageously transmits a control signal to an actuator unit of the adjustment device when the verification sensor signal does not meet the predefined verification condition. In particular, it is provided to act on the adjustment device by means of the activated actuator unit in such a way that the verification condition is met.

According to a further advantageous configuration of the disclosure, a position sensor signal for detecting the position of the positioning unit, in particular for detecting the position of the positioning unit with reference to the support unit, is received as a verification sensor signal by the control unit associated with the steering column. An evaluation is here advantageously made as a verification condition as to whether the position of the positioning unit is suitable for moving the positioning unit or a steering handle arranged on the positioning unit into a stowed position. The verification condition is here advantageously met when the position is suitable for moving the positioning unit or a steering handle arranged on the positioning unit into the stowed position.

A steering setting angle sensor signal is further advantageously received as a verification sensor signal for detecting the steering setting angle of a steering handle. An evaluation is advantageously made as a verification condition as to whether the steering setting angle of the steering handle is suitable for moving the positioning unit or a steering handle arranged on the positioning unit into a stowed position. The verification condition is here advantageously met when the steering setting angle is suitable for moving the positioning unit or a steering handle arranged on the positioning unit into the stowed position.

An angle of inclination sensor signal for detecting the angle of inclination of the positioning unit is further advantageously received as a verification sensor signal. An evaluation is advantageously made as a verification condition as to whether the angle of inclination of the steering handle is suitable for moving the positioning unit or a steering handle arranged on the positioning unit into a stowed position. The verification condition is here advantageously met when the angle of inclination is suitable for moving the positioning unit or a steering handle arranged on the positioning unit into the stowed position. In particular, it is provided that the angle of inclination is not determined directly. In particular, it is provided that the angle of inclination is based on a situation of a height adjustment drive of the steering column. The situation of the height adjustment drive is thus determined and the situation of the angle of inclination calculated therefrom. The calculated value advantageously corresponds to the angle of inclination sensor signal. The situation of the height adjustment drive can be found by counting Hall counts of the electric motor of the height adjustment drive. Alternatively or additionally, a position sensor can be provided by means of which the situation of the height adjustment drive or the position of the positioning unit in the height adjustment direction relative to the support unit can be determined.

In the different Figures, the same parts are generally provided with the same reference signs and are therefore sometimes also explained in each case only in connection with one of the Figures.

Figure 1:
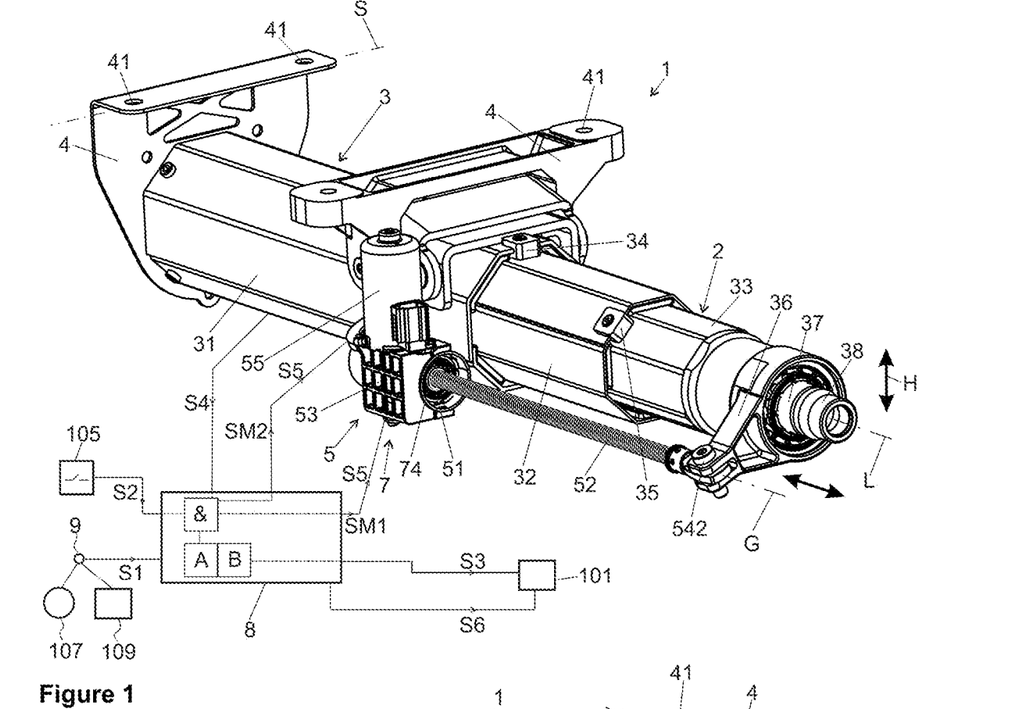
FIG. 1 shows a simplified perspective illustration, an exemplary embodiment for a steering column designed according to the disclosure.
Figure 2:
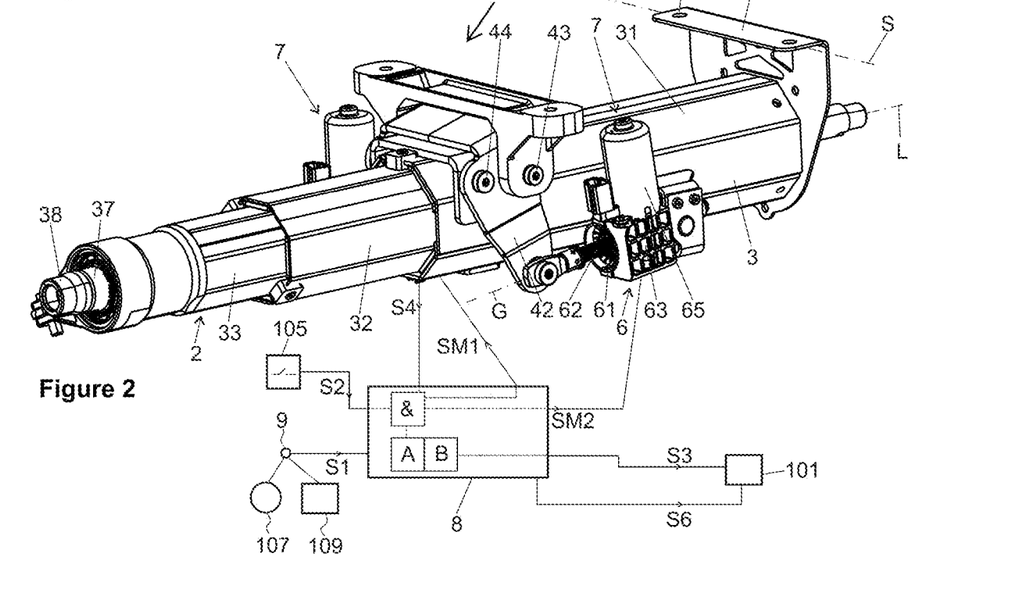
FIG. 2 shows a further simplified perspective illustration, the exemplary embodiment according to FIG. 2.

FIG. 1 shows an exemplary embodiment for an electrically adjustable steering column 1 designed according to the disclosure in a schematic perspective view, obliquely from the upper left-hand side, of the rear end, relative to the driving direction of a vehicle which is not illustrated, where a steering wheel which is not illustrated here is held in the use area. FIG. 2 shows the steering column 1 in a view from the opposite side, i.e. seen from the upper right-hand side.

The steering column 1 comprises a sleeve unit 3 which has an outer sleeve tube 31, an intermediate sleeve tube 32, and an inner sleeve tube 33. The sleeve tubes 31, 32, and 33 are arranged, so that they can be adjusted telescopically coaxially inside one another, axially in the axial direction of a longitudinal axis L, as indicated by a double-headed arrow.

A limit stop 34, which protrudes at the open end inward into the intermediate space between the outer sleeve tube 31 and the intermediate sleeve tube 32, is attached at the rear end on the outer sleeve tube 31. In the case of extension, the intermediate sleeve tube 32 abuts the limit stop 32 axially and is secured against disconnection from the outer sleeve tube 31. A limit stop 35, which protrudes inward into the intermediate space between the intermediate sleeve tube 32 and the inner sleeve tube 33 and which secures the inner sleeve tube 33 against being pulled out of the intermediate sleeve tube 32, is attached at the rear end of the intermediate sleeve tube 32.

A steering spindle 37, which has at its rear end a connection section 38 for the attachment of a steering handle not illustrated in FIG. 1 and FIG. 2, is mounted in the sleeve unit 3 so that it can rotate about the longitudinal axis L. The steering spindle 37 is, like the sleeve unit 3, likewise designed as telescopic in the longitudinal direction. A positioning unit 2 of the steering column 2 comprises the inner sleeve tube 33 together with the steering spindle 37 mounted therein. This positioning unit 2 is housed so that it can be displaced telescopically in the outer sleeve tube 31 in the direction of the longitudinal axis L for the purpose of effecting a longitudinal adjustment relative to the sleeve unit 3, in order to be able to position the steering wheel connected to the steering spindle 37 forward and backward in the longitudinal direction relative to the support unit 4, as indicated by the double-headed arrow parallel to the longitudinal axis L.

The sleeve unit 3 is held in a two-part support unit 4 which has fastening means 41 for attachment to a vehicle body which is not illustrated.

The sleeve unit 3 is mounted so that it can pivot, relative to the vehicle body, in its front region about a schematically illustrated horizontal pivot axis S lying transversely to the longitudinal axis L. For this purpose, a pivot bearing (not illustrated) is arranged in the support unit 4 or between this support unit 4 and the vehicle body. The sleeve unit 3 is connected in the rear region to the support unit 2 via a positioning lever 42. By virtue of a rotational movement of the positioning lever 42 by means of an adjustment unit 6 of the adjustment device 7 of the steering column 1, as shown in FIG. 2, the sleeve unit 3 can be adjusted, in particular pivoted, together with the positioning unit 2 relative to the support unit 4 about the pivot axis S which lies horizontally in the installed state, as a result of which in particular adjustment of a steering handle attached to the fastening section 38 can be carried out in the height direction H, as indicated by the double-headed arrow.

A further adjustment unit 5 of the adjustment device 7 of the steering column, as shown in FIG. 1, is designed in particular for longitudinal adjustment of the positioning unit 2 relative to the sleeve unit 3 and relative to the support unit 4 in the direction of the longitudinal axis L. In this exemplary embodiment, the further adjustment unit 5 has a spindle drive with a spindle nut 51, with an internal thread 74 extending along a spindle axis G, into which a threaded spindle 52 engages, i.e. is screwed into the corresponding internal thread 74 of the spindle nut 51 with its external thread. In this exemplary embodiment, the threaded spindle axis of the threaded spindle 52 is identical to the spindle axis G and runs essentially parallel to the longitudinal axis L.

The spindle nut 51 is mounted in a bearing housing 53, which is fixedly connected to the outer sleeve tube 31 of the sleeve unit 3, so that it can rotate about the spindle axis G. In the direction of the spindle axis G, the spindle nut 51 is supported on the sleeve unit 3 axially via the bearing housing 53. In this exemplary embodiment, the adjustment device 5 is accordingly a so-called plunging spindle drive.

The threaded spindle 52 is connected at its free end to the inner sleeve tube 33 via a fastening bolt 542 on an arm 36, supported in a non-rotatable and axially fixed fashion, and the spindle nut 51 is supported axially, i.e. in the longitudinal direction, on the outer sleeve tube 31 via the drive unit 53. The longitudinal direction corresponds to the direction of the longitudinal axis L. The threaded spindle 52 and the spindle nut 51 are moved together or apart from each other depending on the direction of rotation by a relative rotation by means of the electric motor 55 of the adjustment unit 5 of the adjustment device, as a result of which the inner sleeve tube 33 is retracted or extended into the intermediate sleeve tube 32, and the latter into the axial sleeve tube 31, as indicated by the double-headed arrow. A steering wheel which can be attached to the connection section 38 can be moved forward into a stowed position or into a use position as a result. In the stowed position, the inner sleeve tube 33 and the intermediate sleeve tube 32 are retracted into the outer sleeve tube 31, i.e. are lowered in a forward direction. In the use position, the sleeve tubes 31, 32, and 33 are extended telescopically from one another.

In FIG. 2, which shows a perspective view of the steering column 1 from the side situated to the rear in FIG. 1, it can be seen how the adjustment unit 6 of the adjustment device 7 for adjustment in the height direction H is attached to the steering column 1. The adjustment unit 6 of the adjustment device 7 is in principle constructed so that it acts in the same way as the further adjustment unit 5 of the adjustment device 7. The adjustment unit 6 also comprises a spindle nut 61 in the internal thread of which a threaded spindle 62 engages along a spindle axis G. The threaded spindle 62 is mounted, so that it can rotate about the axis G, in a bearing housing 63 which is fastened to the sleeve unit 3, and is supported axially, in the direction of the axis G, on the sleeve unit 3, and can be driven in rotation about the axis G selectively in both directions of rotation by an electric motor 65.

The adjustment units 5, 6 of the adjustment device 7 of the steering column 1 are so-called plunging spindle drives in the embodiment illustrated. Alternatively, a rotational spindle drive can in particular also be designed in which the spindle nut 51 is retained on the steering column 1 in terms of rotation and the threaded spindle 52 can be driven in rotation by the motor 55.

The adjustment unit 6 engages with the end of the two-armed positioning lever 42 which is mounted on the support unit 4 so that it can rotate a pivot bearing 43, and the other arm of which is connected with its other end to the sleeve unit 3 in a further pivot bearing 44.

The steering column 1 further comprises a control unit 8 illustrated only schematically in FIG. 1 and FIG. 2. The steering column 1 further comprises, in the exemplary embodiment shown in FIG. 1 and FIG. 2, an interface 9 via which an external sensor 107 and an external control unit 109 of a motor vehicle are attached to the control unit 8. The external sensor 107 can here supply in particular an acceleration signal as a sensor signal. The external control unit 109 can in particular supply a control signal which results from an evaluation of a current driving situation. A signal S1 comprising the sensor signal and the control signal is here transmitted to the control unit 8. The control unit 8 is here designed to receive the signal S1 and evaluate the signal S1 in terms of a predefined release condition. A predefined acceleration value, which must not be exceeded in particular because a high acceleration value is indicative of a critical driving situation such as a braking procedure or an overtaking procedure, is defined, for example, as a sensor signal with reference to the acceleration signal. With reference to the control signal, it is, for example, provided that this control signal can be binary, wherein a "0" indicates a normal non-critical driving situation and a "1" indicates a critical driving situation, wherein the control signal triggers an action of a safety-relevant driver assistance system. The release condition is such a case where the control signal has the value "0". The control unit 8 is further designed to produce a release state A when the signal S1 meets the release condition, and to produce a locked state B when the signal S1 does not meet the release condition. It is a prerequisite for adjustment of the positioning unit 2 that the release state A has been produced.

The control unit 8 is moreover designed to receive a request signal S2 by means of which an adjustment procedure of the positioning unit 2 is initiated. In this exemplary embodiment, the request signal is produced by a request unit 105. The request unit can here in particular be a user unit, to be actuated by a user, for adjustment of the positioning unit. The request unit can, however, in particular also be a program module of a central motor vehicle control unit which, for example, when a switch from a self-driving mode to a manual driving mode is initiated, automatically transmits a request signal S2 to the control unit 8 in order to move the positioning unit and hence the steering handle from a stowed position into a use position.

If a request signal S2 for initiating an adjustment procedure of the positioning unit 2 is present at the control unit 8, a check is made as to whether the release state A has been produced. In particular, it can be provided that a release signal is produced only in the release state A, which release signal is AND-ed with the request signal S2 via an AND gate. In the locked state B, in contrast, no release signal is present and the presence of a request signal S2 does not result in the positioning unit being adjusted. If, in contrast, the release state A has been produced and the request signal S2 is present, in this exemplary embodiment a first motor activation signal SM1 for activation of the first electric motor 55 of the adjustment device 7 is produced, and a second motor activation signal SM2 for activation of the second electric motor 65 of the adjustment device 7 is produced, in order to adjust the positioning unit 2 in accordance with the request made. The control unit 8 is here further designed to receive a verification sensor signal S4 in the release state A produced, in particular during an adjustment procedure of the positioning unit 2. The verification sensor signal S4 here relates in particular to the current position of the positioning unit 2 with reference to the support unit 4. The control unit 8 evaluates the control signal S4 with reference to a predefined verification condition. On the basis of the verification condition, a check is made as to whether the position of the positioning unit 2 is suitable for continuing to carry out the adjustment procedure in accordance with the request made. If the result of the evaluation of the control unit 8 is that the predefined verification condition has not been met, the control unit 8 transmits an output signal S6 to an output device 101, in particular a display. The output signal S6 thus produces a notification for a user by means of which a problem in the adjustment procedure can be indicated. In particular, it is further provided that, when the verification condition is not met, the control unit 8 produces a control signal S5 by means of which, depending on the result of the evaluation of the verification sensor signal S4, the first electric motor 55 and/or the second electric motor 65 of the adjustment device 7 is activated in order to effect adjustment of the positioning unit 2 in such a way that the adjustment request can continue to be performed.

The control unit 8 of the steering column 1 is further designed to transmit an output signal S3 to the output device 101, in particular a display, in order to produce a notification at the output device 101. Such an output signal S3 is produced when a request signal S2 is present. The output signal S3 here differs, however, depending on whether the release state A or the locked state B is produced. If the release state A is produced, the output signal S3 triggers a notification that an adjustment procedure is starting. If, in contrast, the locked state B is produced, the output signal S3 triggers a notification that adjustment is not possible at the current time. In particular, a reason for the locked state can here be output.

Figure 3:
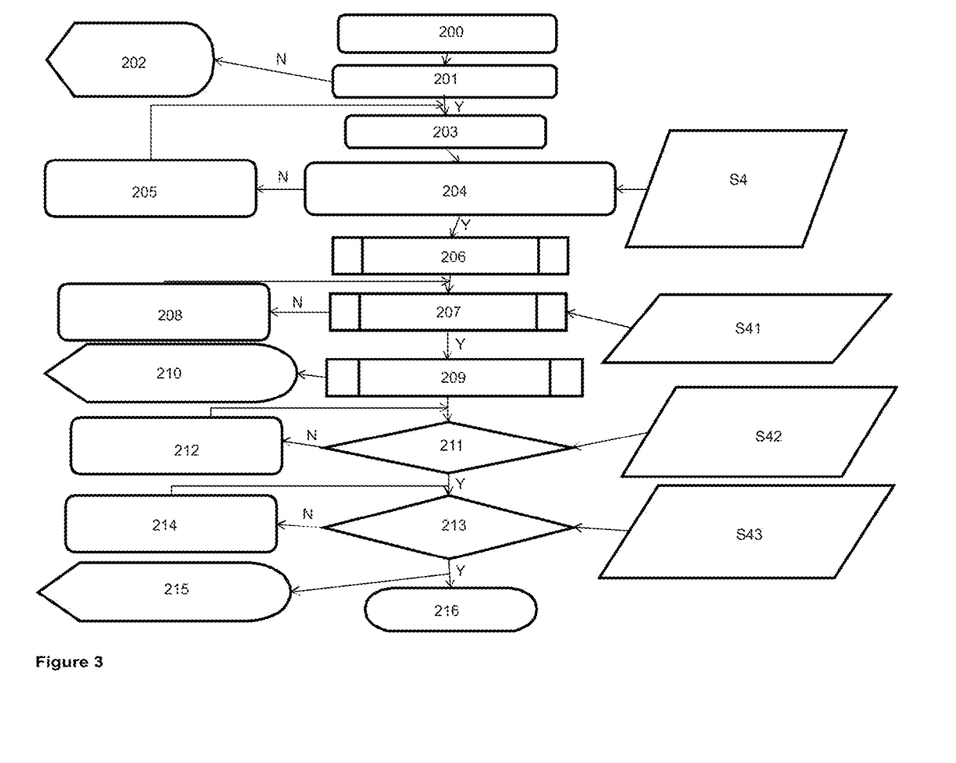
FIG. 3 shows a flow diagram, showing an exemplary embodiment for a method designed according to the disclosure.

An advantageous exemplary embodiment for a method for operating an electrically adjustable steering column 1, in particular as explained with reference to FIG. 1 and FIG. 2, is described below with reference to the flow diagram illustrated in FIG. 3. A path labeled "N" is here followed when a condition to be checked is not met. A path labeled "Y" is followed when a condition to be checked is met.

In a step 200, an adjustment operation for stowing the positioning unit 2 and hence a steering handle arranged on the positioning unit 2 is selected by a driver or activated by a central control unit of the motor vehicle. A request signal S2 is in particular here transmitted to the control unit 8 associated with the steering column 1. In a step 201, a check is next made as to whether the motor vehicle is in a state which allows the adjustment operation to be performed. For this purpose, it is in particular provided that the control unit 8 associated with the steering column 1 receives a signal 51 and evaluates this signal 51 in terms of a predefined release condition. If the release condition is not met and the motor vehicle is thus not in a state which allows the adjustment operation to be performed, a locked state B is produced and in a step 202 an error message is displayed, for which reason the control unit 8 transmits in particular an output signal S3 to an output device 101. It can in addition be provided that an instruction is transmitted by the control unit 8 to bring the motor vehicle into a state which allows the adjustment operation to be performed.

If, in contrast, the signal S1 meets the release condition and the motor vehicle is thus in a state which allows the adjustment operation to be performed, in a step 203 a release state A is produced which allows adjustment of the positioning unit 2, and the adjustment procedure is started because of the adjustment request from step 200. The control unit 8 thereupon receives a verification sensor signal S4 which is transmitted in particular by a feedback actuator or at least one position detection sensor of the steering column 1. In a step 204, the received verification sensor signal S4 is evaluated in terms of a predefined verification condition. In this exemplary embodiment, a check is made in the step 204 as to whether the steering spindle of the steering column 1 and hence the steering handle arranged thereon is at a suitable angle to be brought into the stowed position. If the verification sensor signal S4 does not meet this condition, a control signal is produced and transmitted in step 205 by the control unit 8 in order to act on the necessary actuators such that the verification sensor signal S4 meets the verification condition. The process then jumps back to step 203 from step 205. If the verification sensor signal S4 meets the verification condition, in this exemplary embodiment the inclination of the positioning unit 2 is set in step 206 for the requested adjustment position.

The control unit 8 here receives a further verification sensor signal S41 which in particular is transmitted to the control unit 8 by a sensor which detects the height adjustment of the steering column 1. In a step 207, the received verification sensor signal S41 is evaluated in terms of a predefined verification condition. In this exemplary embodiment, a check is made here in step 207 as to whether the correct height and hence the correct angle of inclination of the positioning unit for bringing the positioning unit into the stowed position has been reached. If the verification sensor signal S41 does not meet this verification condition, in a step 208 a control signal is produced and transmitted by the control unit 8 in order to act on the necessary actuators, in particular the second electric motor 65, such that the verification sensor signal S41 meets the verification condition. The process then jumps back to step 207 from step 208. If the verification sensor signal S41 meets the verification condition, in this exemplary embodiment the corresponding telescoped position of the positioning unit 2 is set in a step 209 for the requested adjustment position. In a step 210, a signal can be sent to the motor vehicle control system 109 that the telescoped position of the positioning unit 2 still needs to be set.

In step 211, the control unit 8 receives a further verification sensor signal S42 which is transmitted to the control unit 8 from a sensor which detects the telescoping and hence the longitudinal adjustment of the positioning unit 2 of the steering column 1. In step 211, the received verification sensor signal S42 is evaluated in terms of a predefined verification condition. In this exemplary embodiment, a check is made here in step 211 as to whether the telescoping effort is normal. If the verification sensor signal S42 does not meet this verification condition, in a step 212 a control signal is produced and transmitted by the control unit 8 in order to act on the necessary actuators, in particular the first electric motor 55, such that the verification sensor signal S42 meets the verification condition and in particular a suitable force is supplied for the telescoping. The process then jumps back to step 211 from step 212. If the verification sensor signal S42 meets the verification condition, in this exemplary embodiment a further verification sensor signal S43 relating to the position of the positioning unit 2 is received by the control unit 8 in a step 213 and evaluated in terms of a predefined verification condition. In particular, a check is made on the basis of the verification sensor signal S43 as to whether the stowed position has been reached. If the verification sensor signal S41 does not meet this verification condition, a control signal is produced and transmitted by the control unit 8 in a step 214 in order to act on the necessary actuators, in particular the electric motors 55, 65 of the adjustment device 7, such that the verification sensor signal S43 meets the verification condition. The process then jumps back to step 213 from step 214. If, in contrast, the verification sensor signal S43 meets the verification condition and the requested stowed position has thus been reached, the control unit 8 sends a signal to the motor vehicle control unit 109 in a step 215 that the stowed position has been reached. Furthermore, in a step 216 the adjustment procedure has finished and the system awaits a new request signal S2 for adjustment of the positioning unit 2.

A further exemplary embodiment for a steering column 1 designed according to the disclosure is explained with reference to FIG. 4, wherein the steering column 1 is designed in this exemplary embodiment not as electrically adjustable and instead can only be adjusted manually. The steering column 1 here comprises a support unit 4 with a sleeve unit 3 by which a positioning unit 2 is held adjustably. The steering column 1 further comprises an adjustment device 7 which is designed to enable adjustment of the positioning unit 2 in the longitudinal direction L and in the direction of the height H, as illustrated by the double-headed arrow, relative to the support unit 4. The adjustment device 7 is here designed as a clamping lever which has to be loosened for adjustment of the positioning unit 2. It is provided here that the adjustment device 7 comprises an electrically switchable securing element 71. The securing element 71 can comprise a solenoid which can activate or deactivate a torque lock between the clamping lever and a clamping axis. If the securing element 71 is activated, the clamping lever is non-functional and makes no contact. If the securing element 71 is deactivated, the clamping lever can be used as intended. The securing element 71 is here activated or deactivated by a control unit 8 of the steering column 1. The control unit 8 is here designed to receive a signal S1 relating to a driving state from a central motor vehicle control system 109 and to evaluate the signal S1 in terms of a predefined release condition. The predefined release condition is here met when the received signal S1 is associated with a safe driving state. The predefined release condition is not met when the received signal S1 is associated with an unsafe driving state. If the signal S1 meets the release condition, the control unit 8 produces a release state A in which a release signal SF is transmitted to the electrically switchable securing element 71, as a result of which the securing element 71 is deactivated and adjustment of the positioning unit 2 is enabled via the adjustment device 7. If, in contrast, the signal S1 does not meet the release condition, the control unit 8 produces a locked state B in which no release signal SF is transmitted to the electrically switchable securing element 71, as a result of which the securing element 71 remains activated and adjustment of the positioning unit 2 via the adjustment device 7 is not possible.

In another embodiment, the adjustment device comprises an electromechanical fixing device. The electromechanical fixing device can be switched between a fixed position and a loosened position, wherein in the fixed position the positioning unit 2 is fixed relative to the support unit 4, and in the loosened position the positioning unit 2 can be adjusted manually relative to the support unit 4. Such electromechanical fixing devices are known from the prior art and therefore are not described in more detail at this point. Reference is made to DE 10 2017 000 354 A1 which discloses such an electromechanical fixing device.

Figure 4:
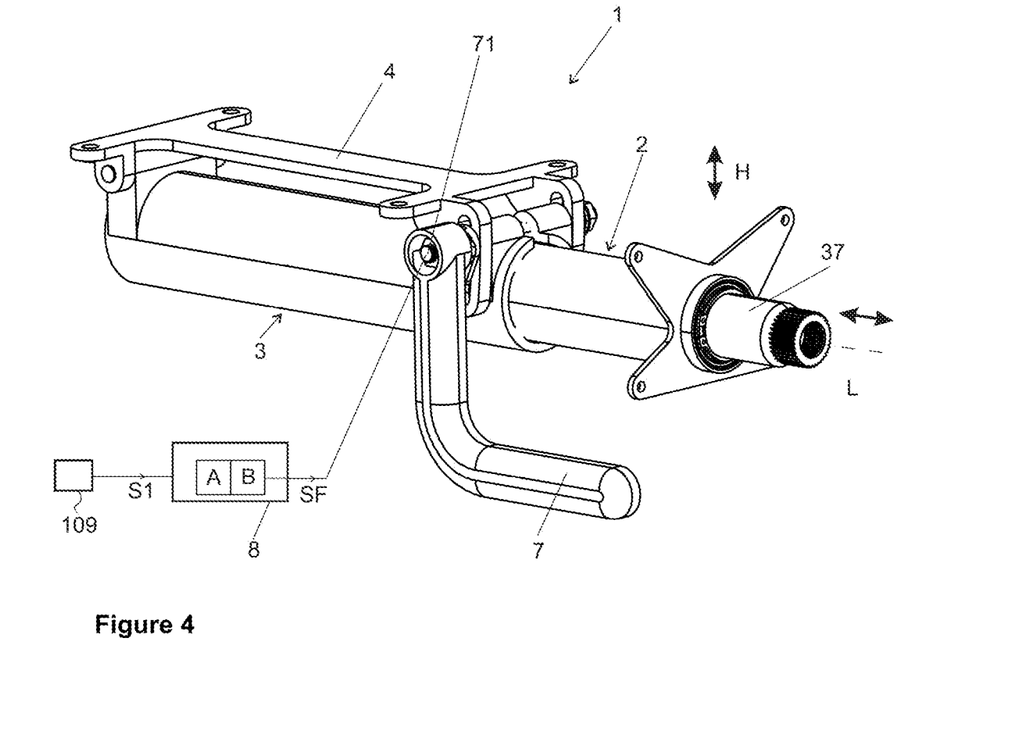
FIG. 4 shows, a perspective illustration, a further exemplary embodiment for a steering column designed according to the disclosure.
Figure 5:
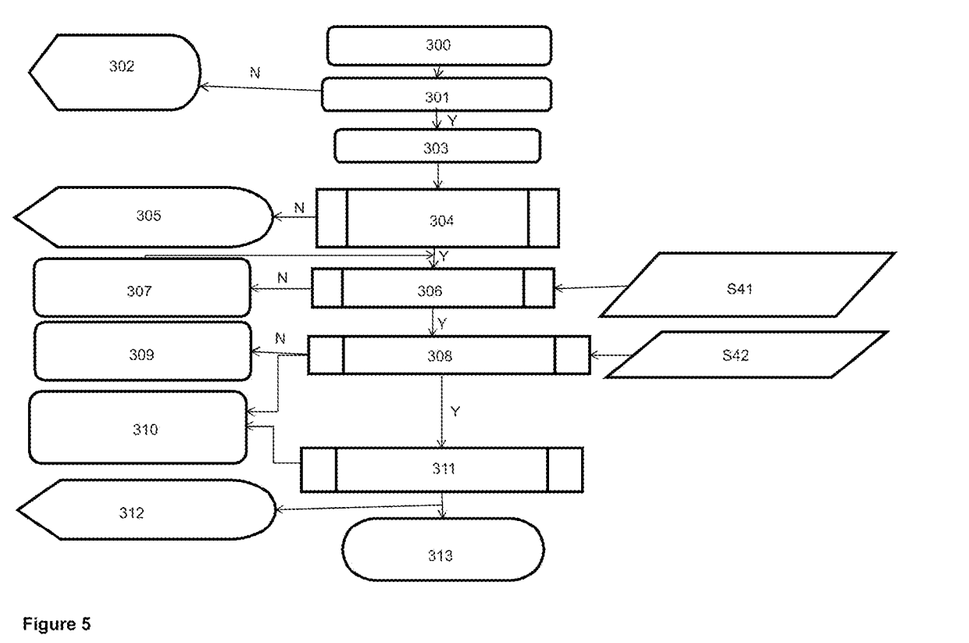
FIG. 5 shows, a flow diagram, showing a further exemplary embodiment for a method designed according to the disclosure.

An advantageous exemplary embodiment for a method for operating a manually adjustable steering column 1, in particular as explained with reference to FIG. 4, is described below with reference to the flow diagram illustrated in FIG. 5. A path labeled "N" is here followed when a condition to be checked has not been met. A path labeled "Y" is followed when a condition to be checked has been met.

In a step 300, it is intended that an adjustment operation for stowing the positioning unit 2 and hence a steering handle arranged on the positioning unit 2 is started. In a step 301, a check is next made as to whether the motor vehicle is in a state which allows the adjustment operation to be performed. For this purpose, it is provided that the control unit 8 associated with the steering column 1 receives a signal S1 and evaluates this signal S1 in terms of a predefined release condition. If the release condition is not met and the motor vehicle is thus not in a state which allows the adjustment operation to be performed, a locked state B is produced and an error message output in a step 302.

If, in contrast, the signal S1 meets the release condition and the motor vehicle is thus in a state which allows the adjustment operation to be performed, a release state A which allows the positioning unit 2 to be adjusted is produced in a step 303. In a step 304, the control unit 8 communicates to the central motor vehicle control system 109 that adjustment of the positioning unit 2 is enabled. In a step 305, a driver is made aware via an output device 101 that an adjustment procedure can take place. In a step 306, a check takes place as to whether the correct inclination for stowing the positioning unit 2 has been reached. For this purpose, the control unit 8 or the motor vehicle control unit 109 receives a verification sensor signal S41 from a sensor which detects the height adjustment of the positioning unit 2. A predefined sensor value for an adjustment height which enables stowing of the positioning unit 2 is here saved as a verification condition. If the correct adjustment height and hence the correct inclination have not been reached, in a step 307 a driver is made aware via an output device 101 that a further adaptation of the inclination needs to take place. If the correct adjustment height and hence the correct inclination have been reached, a check is made in a step 308 as to whether the correct telescoped position for stowing the positioning unit 2 has been reached. For this purpose, the control unit 8 or the motor vehicle control unit 109 receives a verification sensor signal S42 from a sensor which detects the telescoped position of the positioning unit 2. A predefined sensor value for a telescoped position which needs to be reached for stowing the positioning unit 2 is here saved as a verification condition. If the correct telescoped position and hence the correct longitudinal adjustment have not been reached, in a step 309 a driver is made aware via an output device 101 that a further adaptation of the telescoped position needs to take place. In addition, in a step 310 the relevant motor vehicle restraint system for the driver, in particular the airbags assigned to the driver, is adapted via the central motor vehicle control system 109 to the actual telescoped position of the positioning unit 2. If the correct telescoped position and hence the correct longitudinal adjustment have been reached, in a step 311 the central motor vehicle control system 109 signals that the stowed position has been reached, which in turn causes in step 310 the relevant motor vehicle restraint system for the driver to be adapted via the central motor vehicle control system 109 to the actual telescoped position of the positioning unit 2, namely the stowed position. In a step 312, a driver is made aware via an output device 101 that the positioning unit 2 has been moved into the stowed position. The adjustment procedure ends with the step 313. The position of the positioning unit 2 here advantageously continues to be monitored.

Figure 6:
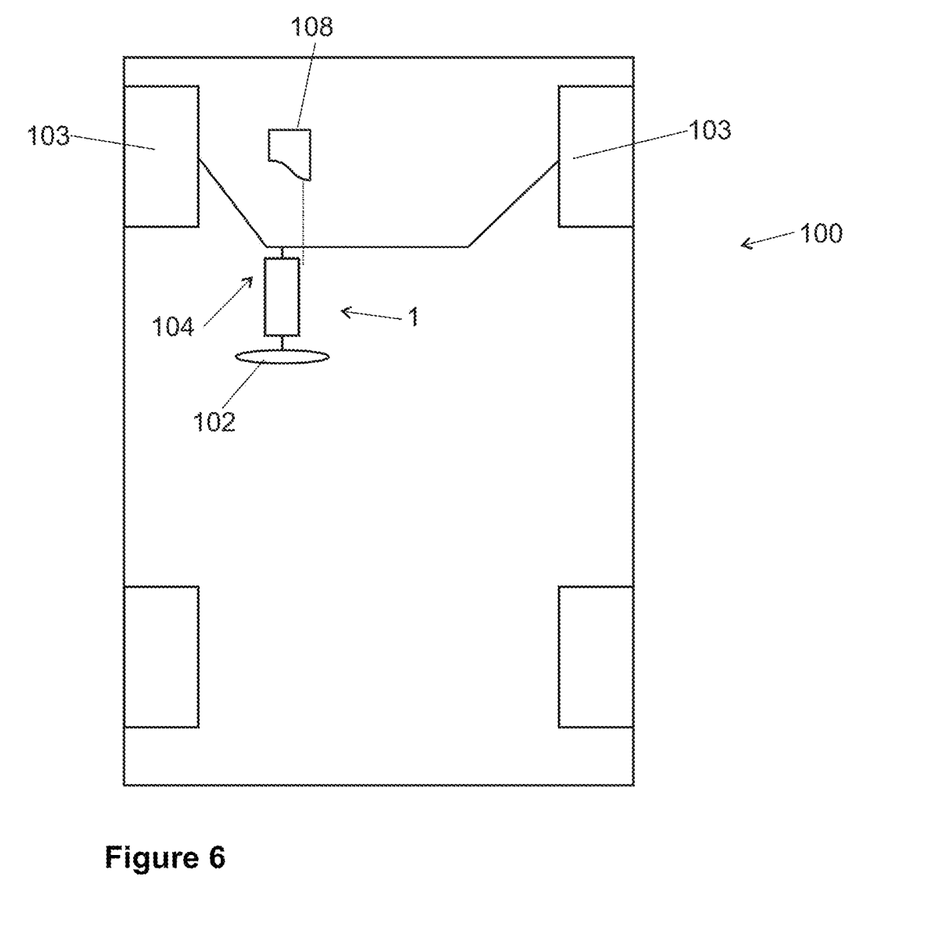
FIG. 6 shows, in a simplified illustration, an exemplary embodiment for a motor vehicle designed according to the disclosure.

A motor vehicle 100 is illustrated schematically in FIG. 6. The motor vehicle 10 comprises a steering system 104 with an adjustable steering column 1, a steering wheel 102, and steerable wheels 103. The motor vehicle 100 further comprises a central motor vehicle control unit 108. The steering column 1 can here be designed in particular as explained with reference to FIG. 1 and FIG. 2 or with reference to FIG. 4, with the difference that in this exemplary embodiment the motor vehicle control unit 108 is associated with the steering column 1 as a control unit and the steering column 1 does not comprise its own control unit. This means that all the control functions which have been explained, for example, in connection with FIG. 1 and FIG. 2 or in connection with FIG. 4 are performed by the motor vehicle control unit 108.

The exemplary embodiments illustrated in the Figures and explained in connection therewith serve to explain the disclosure and are not limiting therefor.

LIST OF REFERENCE SIGNS

1 steering column
2 positioning unit
3 sleeve unit
31 outer sleeve tube
32 intermediate sleeve tube
33 inner sleeve tube
34, 35 limit stop
36 arm 37 steering spindle
38 connection section
4 support unit
41 fastening means
42 positioning lever
43, 44 pivot bearing
5, 6 adjustment unit
51, 61 spindle nut
52, 62 threaded spindle
53, 63 bearing housing
542 fastening bolt
55, 65 electric motor
7 adjustment device
8 control unit
9 interface
71 electrically switchable securing element
74 internal thread
100 motor vehicle
101 output device
102 steering wheel
103 steerable wheel
104 steering system
105 request unit
107 external sensor
108 central control unit of a motor vehicle (100)
109 central control unit of a motor vehicle
200 to 216 method steps
300 to 313 method steps
A release state
B locked state
L longitudinal axis
S pivot axis
G spindle axis (threaded spindle axis)
S1 signal
S2 request signal
S3 output signal
S4, S41, S42, S43 verification sensor signal
S5 control signal
S6 output signal
SM1, SM2 motor activation signal
SF release signal
N verification condition not met
Y verification condition met

What is claimed is:

1. An adjustable steering column for a motor vehicle, comprising:
   a support unit by which a positioning unit is adjustably held, and
   an adjustment device which is designed to adjust the positioning unit relative to the support unit between a stowed position and a use position,
   wherein associated with the steering column is a control unit configured to receive at least one signal,
   wherein the control unit is configured to evaluate the at least one signal in terms of a predefined release condition and to produce a release state of the steering column when the at least one signal meets the release condition, and to produce a locked state of the steering column when the at least one signal does not meet the release condition,
   wherein adjustment of the positioning unit between the stowed position and the use position is enabled exclusively in the release state.

2. The steering column of claim 1, wherein the at least one signal comprises at least one of: at least one sensor signal; at least one control signal from a control unit of a motor vehicle.

3. The steering column of claim 1, wherein the steering column is configured to receive a request signal for initiation of an adjustment procedure of the positioning unit and, when the request signal is received, to enable adjustment of the positioning unit if the release state is produced on receipt of the request signal.

4. The steering column of claim 3, wherein the control unit is configured to transmit an output signal, wherein the output signal is designed to activate an output device for outputting a notification.

5. The steering column of claim 1, wherein the control unit is configured to receive at least one verification sensor signal in the release state produced and to evaluate the verification sensor signal with reference to a predefined verification condition.

6. The steering column of claim 5, wherein the control unit is configured to output a control signal and/or an output signal when the predefined verification condition is not met.

7. The steering column of claim 1, wherein the adjustment device for adjusting the positioning unit comprises at least one electric motor.

8. The steering column of claim 1, further comprising at least one interface for attachment of an external sensor and/or an external control unit.

9. The steering column of claim 1, wherein the steering column is manually adjustable and the adjustment device comprises an electromechanical fixing device that can be switched between a fixed position, in which the positioning unit is fixed relative to the support unit, and a loosened position, in which the positioning unit can be adjusted manually relative to the support unit.

10. The steering column of claim 9 wherein, in the release state of the steering column, the electromechanical fixing device is in the fixed position and, in the locked state of the steering column, the electromechanical fixing device is in the loosened position.

11. A method for operating an adjustable steering column; including an adjustment device configured to adjust a positioning unit of the steering column relative to a support unit of the steering column between a stowed position and a use position, the method comprising:
    receiving, by a control unit associated with the steering column, at least one signal,
    evaluating, by the control unit, the at least one signal in terms of a predefined release condition;
    producing, by the control unit, a release state when the at least one signal meets the predefined release condition, and
    producing, by the control unit, a locked state when the at least one signal does not meet the predefined release condition,
    wherein adjustment of the positioning unit between the stowed position and the use position is prevented in the locked state and enabled in the release state.

12. The method of claim 11, wherein steering column receives a request signal for initiation of an adjustment procedure of the positioning unit.

13. The method of claim 11, wherein an adjustment procedure of the positioning unit is started on receipt of the request signal when the release state is produced on receipt of the request signal.

14. The method of claim 11, wherein the control unit transmits a first output signal to an output device when the locked state is produced on receipt of the request signal.

15. The method of claim 11, wherein the control unit receives at least one verification sensor signal, and the control unit evaluates the at least one received verification sensor signal in terms of a predefined verification condition, wherein the adjustment procedure which has started is continued when the verification sensor signal meets the predefined verification condition; and/or wherein the control unit transmits a second output signal to an output device when the verification sensor signal does not meet the predefined verification condition; and/or wherein the control unit transmits a control signal to an actuator unit of the adjustment device when the verification sensor signal does not meet the predefined verification condition.

16. The method of claim 11, wherein a position sensor signal for detecting the position of the positioning unit is received as a verification sensor signal and is evaluated as a verification condition as to whether the position of the positioning unit is suitable for moving the positioning unit into a stowed position; and/or a steering setting angle sensor signal for detecting the steering setting angle of a steering handle is received as a verification sensor signal and is evaluated as a verification condition as to whether the steering setting angle of the steering handle is suitable for moving the positioning unit into a stowed position; and/or an angle of inclination sensor signal for detecting the angle of inclination of the positioning unit is received as a verification sensor signal and is evaluated as a verification condition as to whether the angle of inclination of the steering handle is suitable for moving the positioning unit into a stowed position.

17. A motor vehicle comprising:
- an adjustable steering column having a support unit by which a positioning unit is adjustably held, and
- an adjustment device which is designed to adjust the positioning unit relative to the support unit between a stowed position and a use position,
- wherein associated with the steering column is a control unit which is designed to receive at least one signal,
- wherein the control unit is further designed to evaluate the at least one signal in terms of a predefined release condition and to produce a release state of the steering column when the at least one signal meets the release condition, and to produce a locked state of the steering column when the at least one signal does not meet the release condition,
- wherein adjustment of the positioning unit between the stowed position and the use position is enabled exclusively in the release state,
- wherein the control unit associated with the steering column is a central control unit.

* * * * *